United States Patent [19]
Goetz

[11] Patent Number: 5,857,346
[45] Date of Patent: Jan. 12, 1999

[54] REACTANT FOR THERMOCHEMICAL SYSTEMS AND THERMOCHEMICAL SYSTEM INTENDED TO EMPLOY SUCH A REACTANT

[75] Inventor: Vincent Goetz, Perpignan, France

[73] Assignee: Elf Aquitaine, France

[21] Appl. No.: 906,255

[22] Filed: Aug. 5, 1997

Related U.S. Application Data

[63] Continuation of Ser. No. 549,176, Oct. 27, 1995, abandoned.

[30] Foreign Application Priority Data

Oct. 28, 1994 [FR] France .................................. 94 12938

[51] Int. Cl.$^6$ .............................. F25B 15/00; F25B 17/08
[52] U.S. Cl. ............................................... 62/112; 62/480
[58] Field of Search ................................... 62/112, 480, 4, 62/476; 252/69

[56] References Cited

U.S. PATENT DOCUMENTS

| | | | |
|---|---|---|---|
| 2,496,459 | 2/1950 | Kleen ........................................ | 62/480 |
| 5,186,020 | 2/1993 | Rockenfeller et al. ................. | 62/457.9 |
| 5,396,775 | 3/1995 | Rockenfeller et al. .................... | 62/112 |
| 5,628,205 | 5/1997 | Rockenfeller et al. .................... | 62/480 |

Primary Examiner—William Doerrler
Attorney, Agent, or Firm—Bacon & Thomas, PLLC

[57] ABSTRACT

A thermochemical system and process for producing heat and/or cold by solid-gas chemical reaction is disclosed. The system and process utilizes a reactant formed of a compressed support and at least two salts which are distributed throughout the compressed support, the salts being active towards a gas. The salts of the reactant are selected for the system and process so that in the system and process one salt will react with the gas in the reactor while the other salts in the reactant remain substantially unreacted to produce heat or cold at a first temperature or power level and, thereafter, one of the other salts of the reactant reacts with the gas to produce heat or cold at a second temperature or power level which is different from the first temperature or power level.

3 Claims, 7 Drawing Sheets

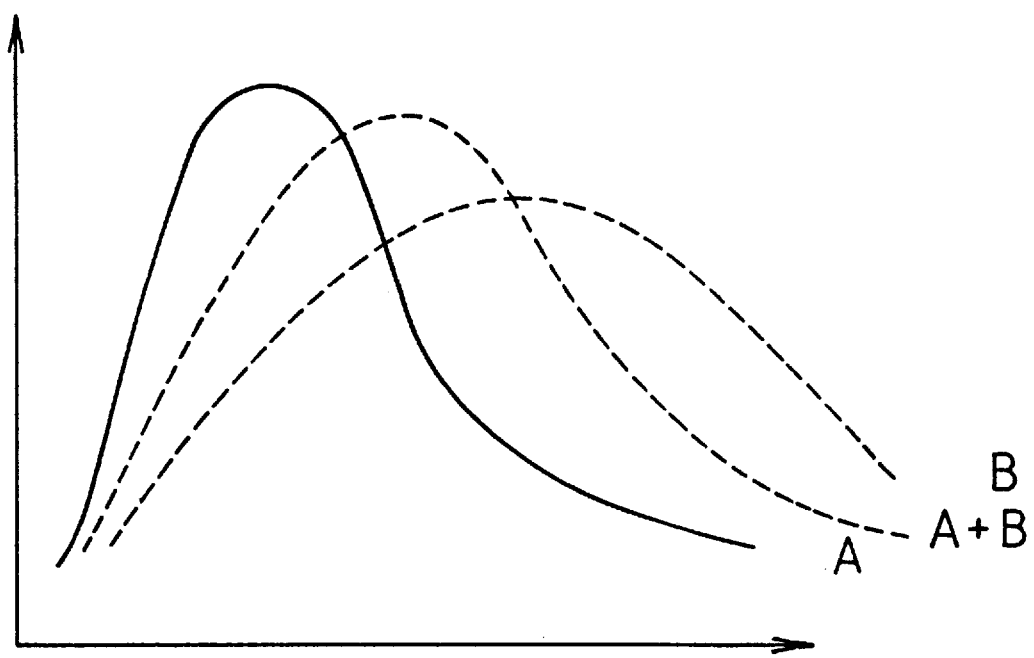
FIG_1

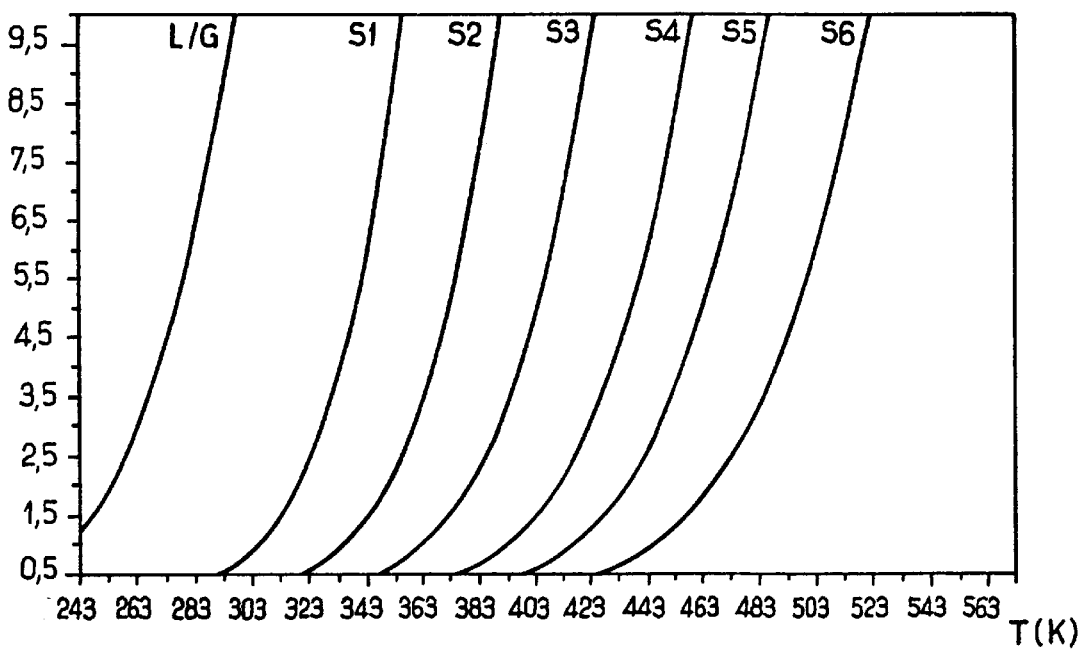
FIG_2
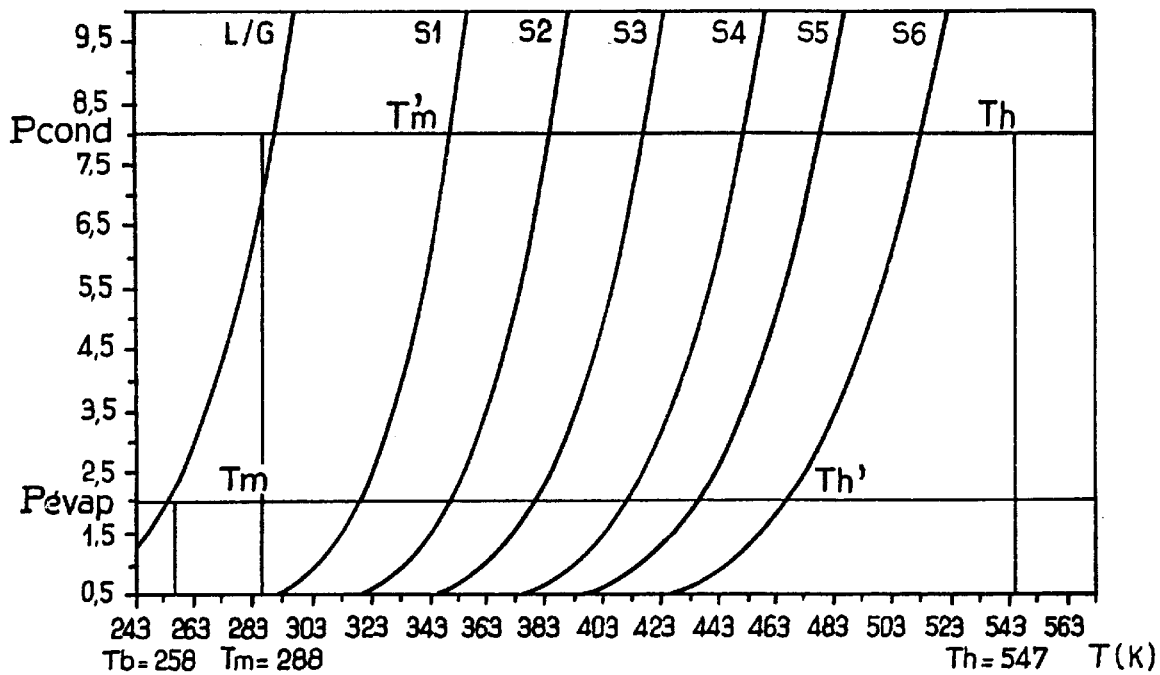
FIG_3

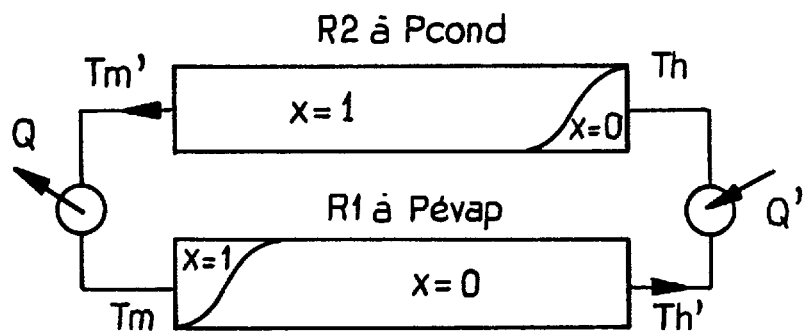
FIG_4A
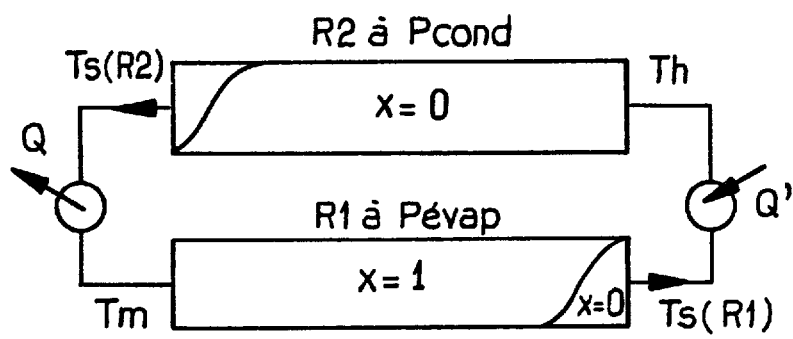
FIG_4B
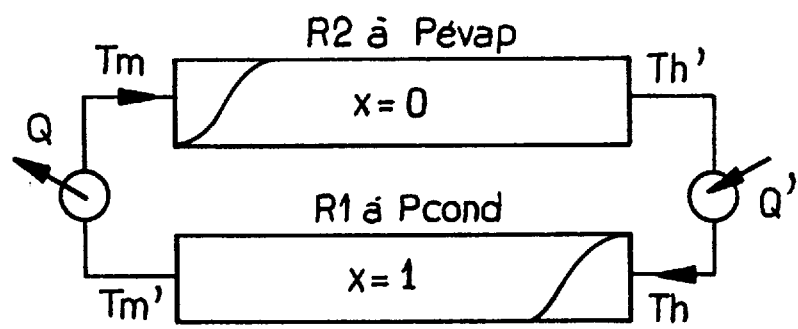
FIG_4C
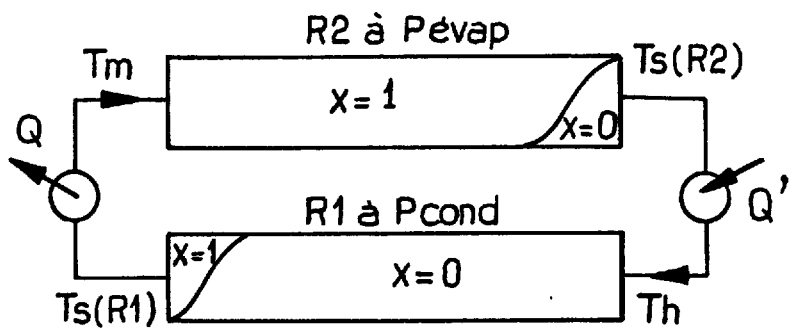
FIG_4D

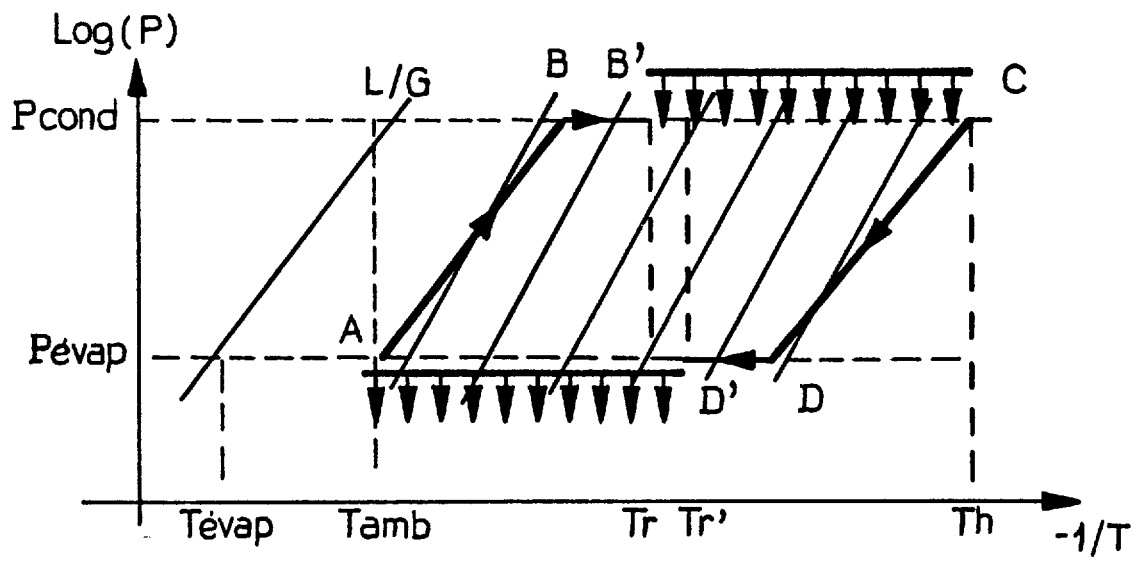
FIG_5A
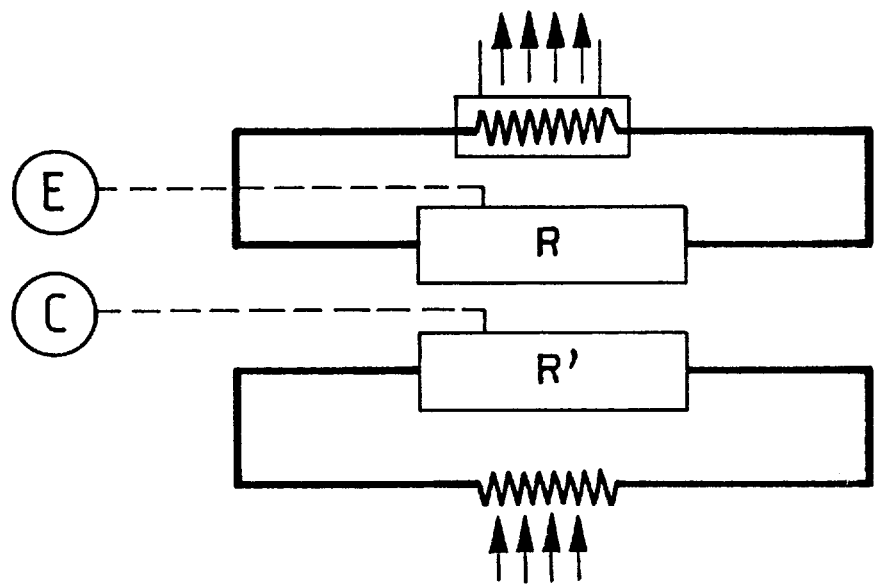
FIG_5B

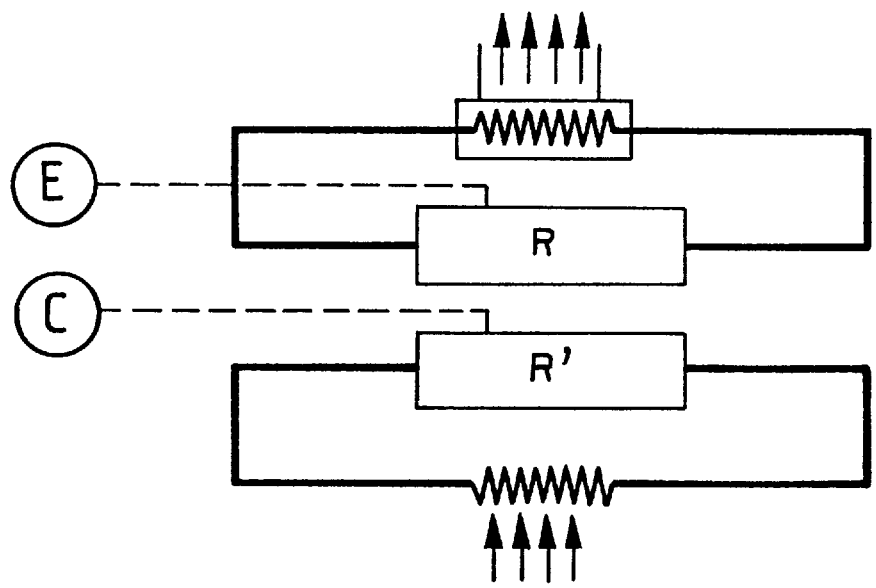
FIG_5F
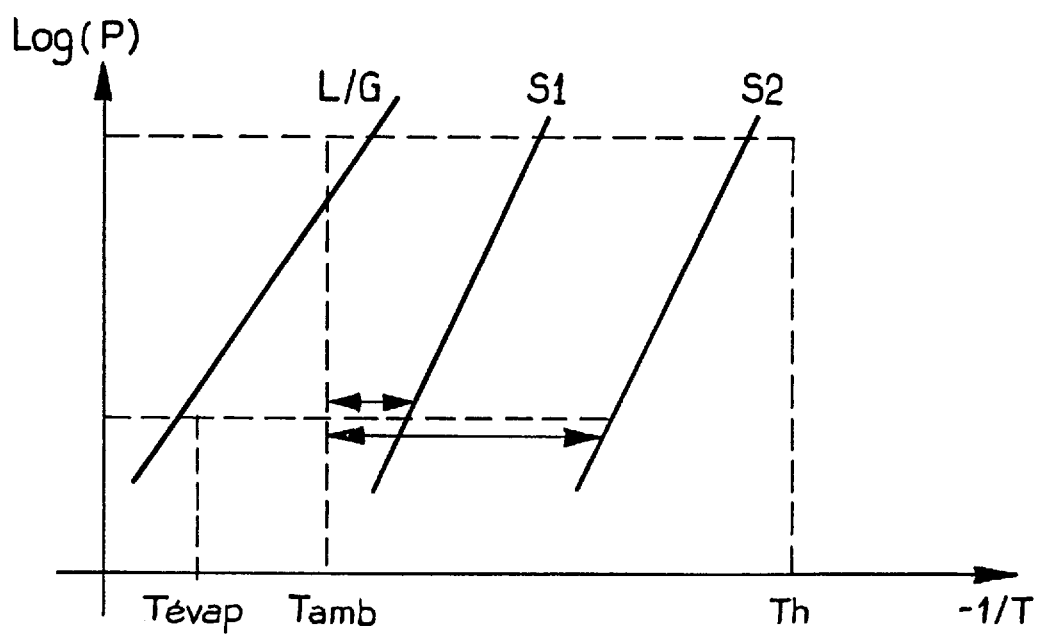
FIG_6

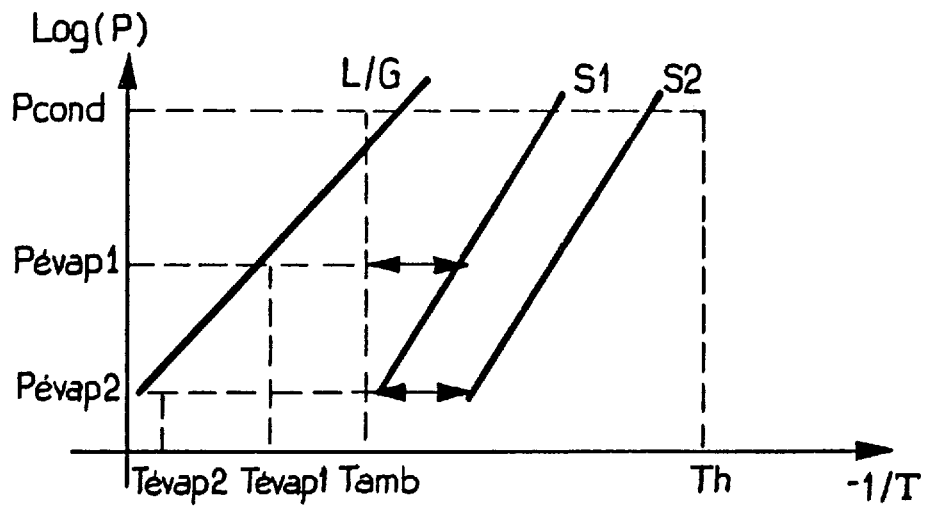
FIG_7A
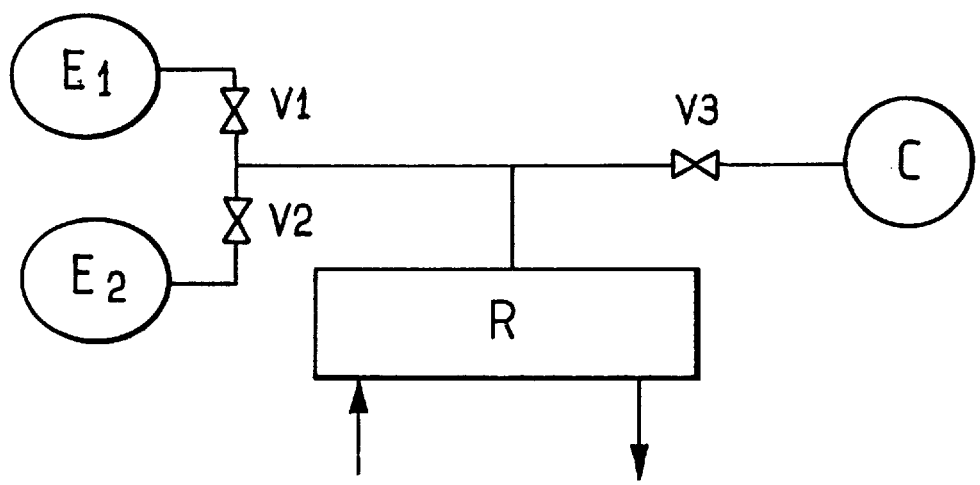
FIG_7B

REACTANT FOR THERMOCHEMICAL SYSTEMS AND THERMOCHEMICAL SYSTEM INTENDED TO EMPLOY SUCH A REACTANT

This application is a continuation of application Ser. No. 08/549,176, filed Oct. 27, 1995 abandoned.

The present invention relates to a reactant for thermochemical systems and to a thermochemical system intended to employ such a reactant.

The reactant which is the subject-matter of the invention is intended to be employed in a thermochemical system whose main characteristics are the following:

heat energy is employed for the functioning of the system itself; electrical energy may optionally be employed only for the circulation of the heat transfer fluids, a reversible reaction between a solid and a gas, of the following type, is employed as a "chemical engine":

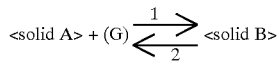

The reaction is exothermic in the direction 1, which means that, in this direction, it produces heat, and endothermic in the direction 2, that is to say that, in this direction, it produces cold.

Such a system enables energy to be stored in chemical form and has various fields of application.

In addition, such a system makes it possible, starting with a source of heat at the temperature Ts, to produce heat at the temperature Tu, such that:

$$Tu<Ts$$

In this case the system is called a "chemical heat pump".

Such a system also makes it possible, starting from a source of heat at the temperature T's, to produce heat at the temperature T'u such that:

$$T'u>T's$$

In this case the system is called a "chemical heat transformer".

By virtue of this system it is possible to produce refrigeration energy from a source of heat and simultaneously to produce, starting from a source of heat at the temperature T"s, heat at the temperature T"u, where (T"u<T"s), and refrigeration energy.

Depending on the case, the use of the heat or of the cold produced is simultaneous with the consumption of energy at high temperature (Ts, T's, T"s) or is delayed in time (storage effect).

The reactant employed in such thermochemical systems includes an active agent, typically a salt, mixed with an inert binder which permits good mass and heat transfer. Expanded graphite, optionally recompressed, is generally employed as binder.

Documents EP-A-0 129 473 and EP-A 0 477 343 describe reactants consisting of a single active agent and of expanded graphite. These reactants are employed for making use of reversible reactions with a gas, for example ammonia.

Thermochemical systems making use of this type of reaction include reaction chambers linked either together in pairs or to an evaporator and a condenser, each reaction chamber containing a mixture of a single salt and of expanded graphite. This type of system is described in document EP-A 0 250 368. Document FR-A-2 6 87 462 describes a thermochemical device which includes reaction chambers, each of which is provided with blocks of reactant which are arranged alongside one another, each block being impregnated with a different salt. The use of this block arrangement considerably improves the performance of the device, more commonly called "COP".

However, the production and the fitting of a number of blocks, each block being provided with an associated salt, present practical difficulties.

The reaction characteristics of a block of reactant made up of expanded graphite which is recompressed and impregnated with a salt are a function of the density of the block, of the salt employed and of its concentration. The use of a single salt to impregnate the graphite results in a range of characteristics which is necessarily limited.

The subject-matter of the present invention is therefore a reactant for thermochemical systems whose characteristics can be selected very broadly in order to make it possible to fulfil more types of functions.

To ao this, the invention proposes a reactant for thermochemical systems, including a compressed support and an agent which is active towards a gas, characterized in that the active -agent includes at least two salts distributed throughout the compressed support.

Another subject-matter of the present invention is a thermochemical system intended to employ a reactant according to the invention.

To do this, the invention proposes a thermochemical system intended to produce cold and/or heat by solid-gas chemical reaction, including a first reactor containing a reactant made up of a compressed support and an agent which is active towards a gas, the reactor being in communication, in a first operating stage, with a vessel intended to retain the gas and, in a second operating stage, with a vessel intended to release the gas, characterized in that the active agent includes at least two salts distributed throughout the compressed support.

The advantages and the functioning of the present invention will appear more clearly on reading the following description, given without any limitation being implied, with reference to the attached drawings, in which:

FIG. 1 shows the reaction-characteristic curves of the blocks of reactants;

FIGS. 2 and 3 are Clapeyron diagrams;

FIGS. 4A, 4B, 4C and 4D are diagrammatic views of a thermochemical system permitting use to be made of the process according to the invention;

FIG. 5A is a Clapeyron diagram relating to a second embodiment of the invention;

FIGS. 5B to 5F are diagrammatic views of a thermochemical system according to the second embodiment;

FIG. 6 is a Clapeyron diagram relating to a third embodiment;

FIG. 7A is a Clapeyron diagram relating to a fourth embodiment of the invention; and FIG. 7B is a diagrammatic view of a thermochemical system according to the fourth embodiment.

Figure 5C:
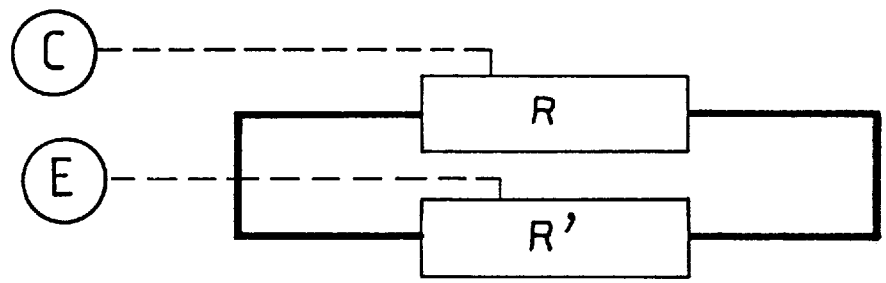

The reaction characteristics of a block of reactant made up of expanded graphite which is recompressed and impregnated with a salt are a function of the density of the block, of the salt employed and of its concentration as well as of the term of departure from equilibrium which is imposed thereon. The term of departure from equilibrium may be denoted by the value of DTeq, the difference between the equilibrium temperature of the salt and the stress temperature imposed on the reactant via an exchanger by a heat transfer fluid. FIG. 1 shows curves of power as a function of time, for blocks of reactant functioning under given thermodynamic conditions: identical levels of pressure and stress temperature.

The continuous line is the reaction curve of a block of recompressed expanded graphite which has a given density, impregnated with a salt A. The hatched line is the reaction curve of the same type of block but impregnated with a salt B. The dotted line is the reaction curve of the same type of block impregnated with salts A and B in a fixed proportion. As follows from FIG. 1, the curve A+B is essentially the resultant of the curves A and B. By combining two or more salts in one block of reactant it is possible, by selecting the salts and their proportions, to produce a reactant which has a given power curve, a curve which is the resultant of the power curves of the salts employed.

The choice of an active agent to be employed in a thermochemical system reactant is a function of the application for which the system is intended. The production of a block of reactant containing two or a number of different salts makes it possible to carry out many applications which could not be envisaged hitherto with reactants containing only a single salt.

In the present context an "active agent" is intended to mean a compound chosen from metal halides, pseudohalides, carbonates, sulphates, nitrates, oxides or hydrides. The gas capable of reacting with such reactive agents may be water, ammonia, $CO_2$, $SO_2$, $SO_3$ or $H_2$.

In the following example a block of recompressed expanded graphite which has a density of between 0.02 and 0.8 is impregnated with a solution of six different salts whose thermodynamic characteristics are shown below:

| Salt | Equilibrium | Enthalpy (J mol$^{-1}$) | Entropy (J mol$^{-1}$K$^{-1}$) |
| --- | --- | --- | --- |
| $S_1$:$CaCl_2$ | (8/4) | 41000 | 230 |
| $S_2$:$ZnCl_2$ | (6/4) | 45000 | 230 |
| $S_3$:$MnCl_2$ | (6/2) | 48000 | 228 |
| $S_4$:$FeCl_2$ | (6/2) | 52000 | 228 |
| $S_5$:$MgCl_2$ | (6/2) | 56000 | 230 |
| $S_6$:$NiCl_2$ | (6/2) | 59000 | 228 |

The functioning of a system making use of the reactant according to the invention is based on the reaction between a salt and a gas. As a real chemical reaction is involved, a monovariant system at equilibrium is present, that is to say that a univocal relationship exists between the temperature and the pressure, of the form log P=A—B/T, in which expression P is the pressure, T the temperature in K and A and B are constants which are characteristic of the salt/gas pair employed.

In the following description the stages of functioning will be represented in Clapeyron diagrams which contain equilibrium curves of the salts employed.

FIG. 2 is a Clapeyron diagram containing the equilibrium curves of the six salts employed for impregnating the block in the present example. The equilibrium curve between the gaseous and liquid phases of the gas employed which, in the example, is ammonia, is also shown.

The composition of the reactant is determined so as to equal the quantities of heat which are needed for the conversion of each salt. Assuming that $\rho_{mix}$ is the density of the recompressed expanded graphite and T1 the graphite content, this gives:

$$\rho_{mix}(1-T1) = \rho_{salt} = \rho_{s1} + \rho_{s2} + \rho_{s3} + \rho_{s4} + \rho_{s5} + \rho_{s6}$$

with the equalities:

$$\forall i = 1 \text{ to } 6 \frac{\rho_{s1}}{M\text{mol}_{s1}} n_{s1}\Delta h_{s1} = \frac{\rho_{si}}{M\text{mol}_{si}} n_{si}\Delta h_{si}$$

$\rho_{si}$ density of the salt i (kg m$^{-3}$)
$M\text{mol}_{si}$ molecular mass of the salt i (kg mol$^{-1}$)
$n_{si}$ stoichiometric coefficient
$\Delta h_{si}$ enthalpy of the reaction of the salt Si joules/mole of gas This then gives:

$$\forall i = 1 \text{ to } 6 : N\text{salt}_{si} = \frac{\rho_{mix}(1-T1)}{n_{si}\Delta h_{si} \sum_{j=1}^{6} \left( \frac{M\text{mol}_{sj}}{n_{sj}\Delta h_{sj}} \right)}$$

$N\text{salt}_{si}$ moles of salt si per cubic metre of reactor.

A process for employing a reactant prepared according to the preceding example will now be studied with reference to the Clapeyron diagram in FIG. 3.

A thermochemical system intended to permit the use of this reactant is shown in FIGS. 4A, 4B, 4C and 4D. This system includes two vessels, each intended to contain a block of reactant; the vessels will be called reactors R1 and R2 hereinafter. The system additionally includes a condenser C and an evaporator E and a source of heat (not shown) intended to provide the high temperature Th. This source of heat may, for example, include a gas burner or an electrical resistance. The system is supplemented by a heat exchanger with the ambient air which allows a heat transfer fluid employed in the system to be cooled to a temperature Tm, and by a circulation pump for this fluid.

The temperature and pressure levels during the different stages of use of the system are shown in the Clapeyron diagram in FIG. 3.

FIG. 4a shows the system during the start-up of the functioning cycle, where the reactor R1 is at the temperature level Th' at the evaporator pressure $P_{evap}$; the reactor R2 is at Tm' at the condenser pressure $P_{cond}$. The circulation pump is running, the heat transfer fluid is heated by the source to Th and begins to heat the right-hand side of the reactor R2. When it passes through the reactor and if the conditions for the formation of a heat front are present together, the heat transfer fluid is cooled to Tm'. It then flows into the heat exchanger which allows it to be cooled from Tm' to Tm. The heat transfer fluid enters the reactor R1 and begins to cool the left-hand side of the reactor R1. When it passes through the reactor the heat transfer fluid is reheated to the initial temperature of the reactor Th'. The fluid is then reheated by the source to Th before being sent to R2.

As this stage progresses, the heat front will gradually move in the direction of circulation of the heat transfer fluid (FIG. 4b):

from the right to the left in the case of the reactor R2;
from the left to the right in the case of the reactor R1.

If the reactors are considered to be at uniform pressure, reheating of R2 from Tm' to Th is accompanied by successive desorptions of the salts which form the reactant. These react locally as a function of their location in the Clapeyron diagram: S1, then S2, then S3, etc., as far as S6. The cooling of the reactor R1 from Th' to Tm is accompanied by successive syntheses of the salts employed. The first salt to react is S6, then S5, etc., as far as S1.

This stage continues as long as the exit temperature of R1 remains sufficiently high (close to Th'), this being in order to minimize the quantity of heat to be supplied to the heat transfer fluid to raise its temperature back from the exit temperature to Th. The test of change of stage can be done on an R1 exit temperature level, a reactor progress level or else on a duration.

The engagement of the next stage is produced by reversing the direction of circulation of the heat transfer fluid. The reactors are isolated from the condenser and from the evaporator. The heat transfer fluid heated to Th by the source of heat now begins to heat the reactor R1 from the right-hand side. On passing through R1 the heat transfer fluid is cooled to a temperature close to Tm; the supplementary heat energy to be removed (if necessary) is obtained by the heat exchanger which imposes the temperature Tm at the entry of the reactor R2. The heat transfer fluid then enters the reactor R2 from the left-hand side. As it passes through, it is reheated to a temperature close to Th.

At the beginning of this stage, R1 is at the pressure $P_{evap}$, R2 is at the pressure $P_{cond}$. The heat input into the reactor R1 entails the beginning of the desorption in the right-hand part of the reactor (looking at the drawings). Since the reactor is isolated, the pressure rises in the whole reactor. The cooling of the reactor R2 on the left-hand side results in the start of the absorption. Since the reactor is isolated, the pressure drops in the whole reactor. The change from Tm to Tm' at the exit of the reactor Rl or from Th to Th' at the exit of the reactor R2 takes place rapidly because it involves only terms of sensible heat; the mixture is outside the reaction region for all the salts. When the pressure in R1 reaches the pressure $P_{cond}$ and the pressure in R2 reaches the pressure $P_{evap}$, the reactors are connected to the condenser and the evaporator respectively (it being possible for this to be done automatically by means of valves). The system then returns to the same conditions as at the beginning of the cycle by reversing the parts played by the reactors R1 and R2 (FIG. 4c).

The sequence in the next half-cycle is identical with the description given above, the numbers of the reactors and the directions of movement of the heat fronts being reversed. At the end of the second stage of production the reactors are in the conditions shown in FIG. 4d.

By employing the reactant of the present invention, this type of operating cycle, when applied to producing cold at evaporation, makes it possible to attain performance levels which are identical with that described in document FR-A-2 687 462.

FIG. 5A is a Clapeyron diagram containing the equilibrium straight lines for the salts employed, as well as the straight line of equilibrium between the gaseous and liquid phases of the gas employed which, in the example, is ammonia.

FIGS. 5B to 5F show a thermochemical system including two reactors R and R', each enclosing a block of reactant containing the six salts illustrated in the Clapeyron diagram of FIG. 5A. Each reactor is equipped with a heat transfer fluid circuit enabling heat to be supplied or extracted. The reactors R and R' can be connected selectively to an evaporator E or to a condenser C by appropriate conduits.

The operating cycle of the system will be studied, reference being made to the points shown in the diagram in FIG. 5A.

The initial state of the system is shown in FIG. 5B, the running conditions of the reactors R and R' corresponding to the points A and C respectively in FIG. 5A. The heat transfer circuit contributes heat at the temperature Tn to the reactor R'. At the same time the reactor R is cooled by its heat transfer circuit.

During the first stage of operation, shown in FIG. 5C, the reactor R changes from the point A to the point B' while being connected to the condenser C from the point B. At the same time the reactor R' changes from the point C to the point D' while being connected to the evaporator E from the point D. The two heat transfer circuits are connected during this stage, the heat transfer fluid being circulated in order to transfer heat between the reactors.

Figure 5D:
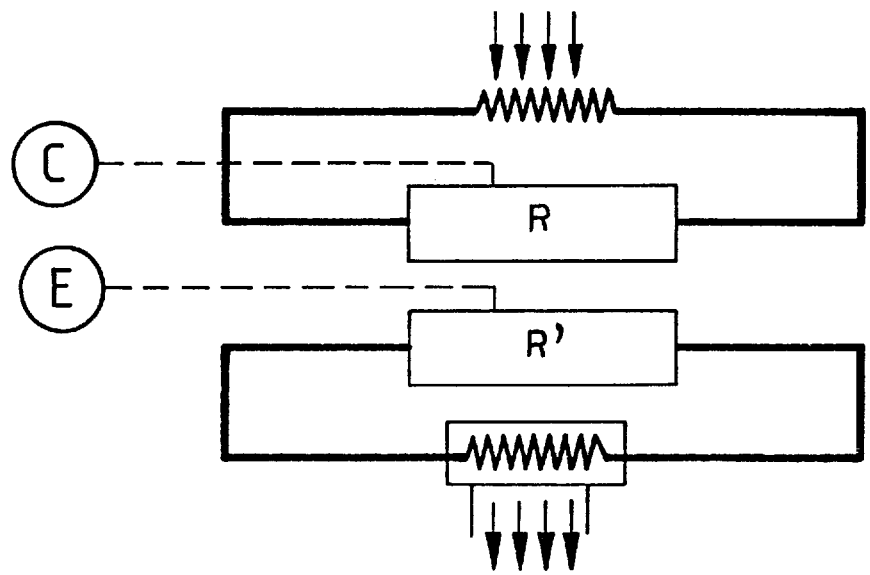

The second stage is shown in FIG. 5D. The reactor R changes from the point B' to the point C, heat being contributed by the heat transfer circuit. The reactor R' changes from the point D' to the point A, heat being extracted by means of the exchanger of the associated heat transfer circuit.

Figure 5E:
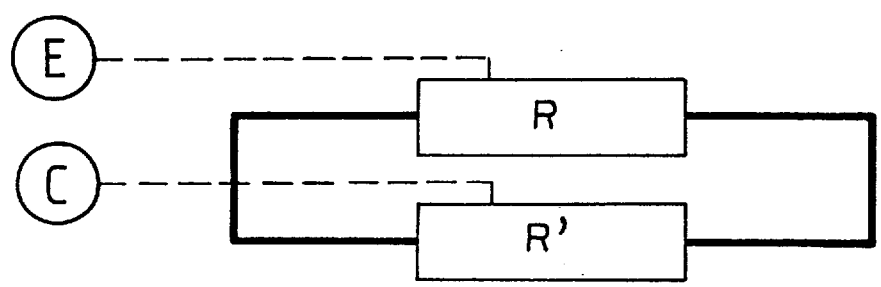

FIG. 5E shows the third stage of operation. The reactor R changes from the point C to the point D' while being connected to the evaporator E from the point D, whereas the reactor R' changes from the point A to the point B' while being connected to the condenser C from the point B. The two heat transfer circuits are connected during this stage, the heat transfer fluid being circulated in order to transfer heat between the reactors.

The final stage of operation is shown in FIG. 5F. During this stage the reactor R changes from the point D' to return to the starting point A. Similarly the reactor R' changes from the point B' to return to its starting point C. During stages 1 and 3 the change of the reactors from the point A to the point B' which, in the proposed example, is accompanied by the decomposition of the two salts situated furthest to the left in the Clapeyron diagram, takes place without consumption of energy external to the system. This enables the COP of the process to be improved. The increase in the COP will depend on the number of salts which are selected and their positioning in the Clapeyron diagram.

In some applications it is desirable for cold, for example, to be produced at two power levels; for example, when it is necessary to lower the temperature of a vessel rapidly and then to maintain the temperature for a certain period of time.

To do this, a block of reactant may be prepared containing two salts S1 and S2 whose equilibrium straight lines are shown in FIG. 6. As follows from the diagram, the departure from equilibrium in relation to the ambient temperature Tamb is markedly greater in the case of the salt $S_2$ than in the case of the salt $S_1$. The salt $S_2$, present in the same block as the salt $S_1$, will begin to react rapidly and will finish reacting with the gas before the salt $S_1$ begins to react. Bearing in mind the small departure from equilibrium, the salt $S_1$ will react more slowly and, therefore, for much longer than the salt $S_2$. It is possible to envisage having a block provided with a number of salts, each salt reacting, one after the other, as a function of its departure from equilibrium in relation to the ambient temperature.

It may also be necessary to have the ability to produce cold at two different temperature levels, for example for operating a refrigerator/deep-freezer. Such a situation is shown in the Clapeyron diagram of FIG. 7A.

A system which allows this type of cold production to be attained is shown in FIG. 7B.

A single reactor R, equipped with a reactant containing two salts $S_1$ and $S_2$ is adapted for being connected selectively to a condenser C or to either of two evaporators $E_1$, $E_2$. The reactor R is first of all placed in communication with the evaporator $E_1$. Both the salts S1 and S2 have undergone their decomposition at Th. At the beginning of the stage of cold production (the temperature imposed on the reactor is Tamb), the greater departure from equilibrium between Tamb and the equilibrium straight line of the salt S2 has the effect of this salt reacting preferentially with the gas and imposing the temperature and pressure level on the reactant mixture. When the pressure in the reactor reaches Pevap2, the reactor is placed in communication with the evaporator E2 and permits the production of cold at the temperature Tevap2. When the reaction between the salt S2 and the gas is finished the valve V2 is closed and the valve V1 is opened. This causes the pressure to rise again from Pevap2 to Pevap1. The salt S1 is then in a synthesis condition and allows the production of cold by evaporation at a temperature Tevap1 which is higher than Tevap2. It is possible to envisage employing a block of reactant impregnated with three or more salts; the user system includes one evaporator per salt employed. Such a system would permit cold at a number of temperature levels.

I claim:

1. A thermochemical system for producing cold and/or hot by solid-gas chemical reaction, comprising a first reactor and a second reactor, each reactor containing a reactant comprised of a compressed support and at least two salts which are active towards a gas distributed through the compressed support and each reactor being equipped with a heat transfer fluid circuit enabling heat to be supplied to or extracted from each reactor, wherein, in one operating stage said first reactor is in communication with a vessel which retains gas released from the first reactor and said second reactor is in communication with a vessel which releases gas to the second reactor and, in another operating stage said first reactor is in communication with a vessel which releases gas to the first reactor and said second reactor is in communication with a vessel which retains gas released from the second reactor and in an intermediate operating stage said heat transfer fluid circuits are connected in order to transfer heat between the reactors so that the decomposition of at least one of the selected salts takes place without consumption of energy external to the system and wherein one of said salts of said reactant is selected so as to react with gas in the reactor during which time the other salts of end reactant remain substantially unreacted, the salts being selected as a function of their equilibrium lines so that, in use, a predetermined difference is defined in the departure from equilibrium for each salt in relation to the ambient temperature.

2. A thermochemical system for producing cold and/or heat by solid-gas chemical reaction, comprising a reactor containing a reactant comprised of a compressed support and at least two salts which are active towards a gas distributed throughout the compressed support wherein one of said salts of said reactant is selected so as to react with gas in the reactor during which time the other salts of said reactant remain substantially unreacted, a condenser in communication with the reactor for retaining gas released from the reactor and at least two evaporators in selective communication with the reactor for releasing gas to the reactor at different temperature levels such that the system produces heat or cold at different temperature or power levels.

3. A thermochemical system as claimed in claim 2, wherein the reactor is in communication with one of the evaporators during an operating stage in which one of said salts of said reactant reacts with gas in the reactor while the other salts of said reactant remain substantially unreacted and the reactor is in communication with a different evaporator during another operating stage in which another of said salts of said reactant reacts with gas in the reactor.

\* \* \* \* \*